(12) United States Patent
Yamada et al.

(10) Patent No.: US 6,698,899 B2
(45) Date of Patent: Mar. 2, 2004

(54) LIGHT SOURCE AND PROJECTOR

(75) Inventors: Haruyoshi Yamada, Shiojiri (JP); Nobuo Watanabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/960,374

(22) Filed: Sep. 24, 2001

(65) Prior Publication Data

US 2002/0039174 A1 Apr. 4, 2002

(30) Foreign Application Priority Data

Sep. 29, 2000  (JP) ........................................ 2000-299639

(51) Int. Cl.⁷ .............................................. G03B 21/18
(52) U.S. Cl. ............................ 353/61; 353/31; 353/119
(58) Field of Search .............................. 353/31, 57, 61, 353/87, 119, 52, 58, 60

(56) References Cited

U.S. PATENT DOCUMENTS

| | | | | |
|---|---|---|---|---|
| 5,722,753 A | * | 3/1998 | Okada et al. | 353/119 |
| 5,743,610 A | * | 4/1998 | Yajima et al. | 353/31 |
| 5,760,875 A | * | 6/1998 | Daijogo et al. | 353/31 |
| 5,860,719 A | * | 1/1999 | Suzuki et al. | 353/61 |
| 6,364,492 B1 | * | 4/2002 | Fujimori et al. | 353/119 |
| 6,398,366 B1 | * | 6/2002 | Hara et al. | 353/57 |
| 6,398,367 B1 | * | 6/2002 | Watanabe | 353/98 |
| 6,443,575 B1 | * | 9/2002 | Miyamoto et al. | 353/58 |
| 6,481,854 B1 | * | 11/2002 | Sugawara et al. | 353/52 |

FOREIGN PATENT DOCUMENTS

| | | | |
|---|---|---|---|
| DE | 42 38 731 A1 | 5/1994 | |
| EP | 0 636 865 A2 | 2/1995 | |
| JP | 08 304739 | 11/1996 | |
| JP | 11329015 A | * 11/1999 | ............ F21M/7/00 |

* cited by examiner

Primary Examiner—Russell Adams
Assistant Examiner—Michelle Nguyen
(74) Attorney, Agent, or Firm—Oliff & Berridge, PLC

(57) ABSTRACT

A pair of openings (302) symmetrically disposed around an optical axis of the reflector (412) is formed on a contact surface of a light-transmissive plate (301) and the reflector (412) and a cooling channel (340) for introducing cooling air to a source lamp (411) through the pair of openings (302) and a first and a second cooling channel shutters (350, 360) for shutting the cooling channel (340) when the case is detached from a projector (1) are provided on a case (300). The source lamp (411) can be efficiently cooled, so that the life of the source lamp (411) can be lengthened. Even when a light-emitting tube of the source lamp (411) is exploded while using the projector (1), the fragments of the light-emitting tube do not fall outside in exchanging the light source (413), and cooling efficiency of the source lamp (411) is not impaired.

16 Claims, 14 Drawing Sheets

LIGHT SOURCE AND PROJECTOR

BACKGROUND OF THE INVENTION

1. Field of the Invention

The present invention relates to a light source used for a projector for modulating light irradiated from a source lamp in accordance with image information to form an optical image and for enlarging and projecting the image, the light source including the source lamp, a reflector for aligning and emitting the light irradiated from the source lamp and a case for accommodating the source lamp and the reflector, and a projector provided with the source lamp.

2. Description of Related Art

Conventionally, a projector for modulating light irradiated from a source lamp in accordance with image information to form an optical image and for enlarging and projecting the image has been used.

Such projectors have been widely used for multimedia presentation in a meeting, scientific society, exhibition etc. Accordingly, in order to obtain vivid projected image by the projector, it is required for the light source to increase luminance thereof.

High-pressure mercury lamp or a metal halide lamp is used as the source lamp. When the life of the lamp expires, light-emitting tube thereof made of silica glass can be exploded to scatter the fragments around. Accordingly, the light source including the source lamp has a transparent glass plate etc. covering a light emitting surface of the reflector to prevent the fragments from scattering around even when the source lamp is exploded.

However, since the source lamp of the above-described light source is enclosed in a space defined by the reflector and the transparent glass plate, the temperature of the source lamp can become high so that the life of the source lamp can be shortened.

On the other hand, a cooling air-introducing opening may be formed on a part of the reflector and the transparent glass plate to cool the light-emitting tube. However, if an opening is formed, it is difficult to completely block the fragments from falling out when the source lamp is exploded.

SUMMARY OF THE INVENTION

An object of the present invention is to provide a light source and a projector capable of preventing fragments from falling out to the outside even when the source lamp is exploded and capable of efficiently cooling the source lamp to lengthen the life thereof.

In order to achieve the above object, a light source according to an aspect of the present invention is used for a projector for modulating a light irradiated from a source lamp to form an optical image in accordance with image information and enlarging and projecting the optical image, the light source including: a source lamp; a reflector for aligning and emitting the light irradiated from the source lamp; and a case for accommodating the source lamp and the reflector, where a light-emitting surface of the reflector is covered by a light-transmissive plate and a pair of openings is formed on a contact surface of the light-transmissive plate and the reflector, the pair of openings being symmetrically disposed around an optical axis of the reflector, and where the case includes a cooling channel for introducing a cooling air to the source lamp through the pair of openings and a cooling channel shutter for shutting the cooling channel when the case is detached from the projector and for opening the cooling channel when the case is attached to the projector.

The above-described pair of openings may be formed by cutting a part of the light-transmissive plate, however, preferably be a recess formed by cutting a part of a distal end of the reflector in the light-emitting direction. This is because the cooling air can be flowed in a direction orthogonal with the optical axis of the reflector and around the source lamp as a heat source, so that the source lamp can be efficiently cooled. In this arrangement, the pair of openings may preferably be disposed in horizontal direction when the case is detached from the projector.

The case for accommodating the source lamp and the reflector refers to a case having a positioning surface for positioning the source lamp and the reflector in an optical axis direction of the irradiated light beam and in a direction orthogonal with the optical axis, which may be arranged as a molding made of plastic by injection molding etc.

According to the above aspect of the present invention, since the cooling channel for introducing the cooling air to the source lamp through the pair of openings is formed on the case, the source lamp can be efficiently cooled to lengthen the life of the source lamp.

Further, since the cooling channel shutter for shutting the cooling channel when being detached is provided, even when the light-emitting tube of the source lamp is exploded while using the projector, the fragments of the light-emitting tube do not fall outside in exchanging the light source. And since the cooling channel shutter opens the cooling channel when the case is attached to the projector, cooling efficiency of the source lamp is not impaired. When the light source is attached so that the pair of openings is horizontally disposed in detaching the case from the projector, the fragments of the light-emitting tube can be further securely prevented from falling outside in exchanging the light source.

In the above arrangement, the cooling channel shutter may preferably include a lid member rotatably supported to the case for shutting the opening formed on the case and a biasing member for biasing the lid member in rotary direction, or alternatively, may preferably include a lid member slidably supported by the case for shutting an opening formed on the case and a biasing member for biasing the lid member in slide direction thereof, which may be provided on one of, or both of air-introducing opening and air-exhausting opening of the cooling channel formed in the case.

Since the cooling channel shutter is made of a lid member and a biasing member, the cooling channel shutter can be provided on the case with a simple arrangement, so that the light source can be easily produced.

In the above, the case may preferably be provided with a duct for guiding an air from an outside of the case to the cooling channel and/or from the cooling channel to the outside of the case.

By forming the duct to the case, introduction of cooling air from outside the case and discharge of the after-cooling air to the outside of the case can be conducted at a position corresponding to the cooling channel in the projector, so that cooling efficiency of the light source can be further enhanced.

Further, a dust filter may preferably be provided on the pair of openings.

The dust filter may only be provided to the air-introducing opening or to the air-exhausting opening, or alternatively to both of the pair of openings.

Since the dust filter is provided, the fragments can be securely prevented from falling out of the case even when the light-emitting tube of the source lamp is exploded. Further, when the dust filter is provided to the air-introducing opening, the dust invasion in accordance with introduction of the cooling air can be prevented, thus avoiding decrease in luminance when the light-emitting tube gets dirty.

A projector according to the present invention includes the above-described light source, which can obtain the same function and effects as in the above.

In the above projector, a duct having an end inserted to the cooling channel shutter while being attached to the light source for introducing the cooling air into the light source may preferably be provided.

By having such duct, the cooling air in the projector can be securely introduced into the light source, thereby further enhancing cooling efficiency of the light source and lengthening the life of the light source.

The duct may preferably include a fan on the base end thereof for transferring the cooling air, or when an exhaust duct for discharging the air having cooled the inside of the light source is provided, the base end of the duct may preferably be connected to the exhaust duct.

Since the fan is provided to the duct or the duct is connected to the exhaust duct, the cooling air can be forcibly transferred from the duct to the cooling channel, so that the circulation of the cooling air can be enhanced to improve the cooing efficiency of the light source.

DETAILED DESCRIPTION OF PREFERRED EMBODIMENT(S)

An embodiment of the present invention will be described below with reference to attached drawings.

1. Primary Arrangement of Projector

Figure 1:
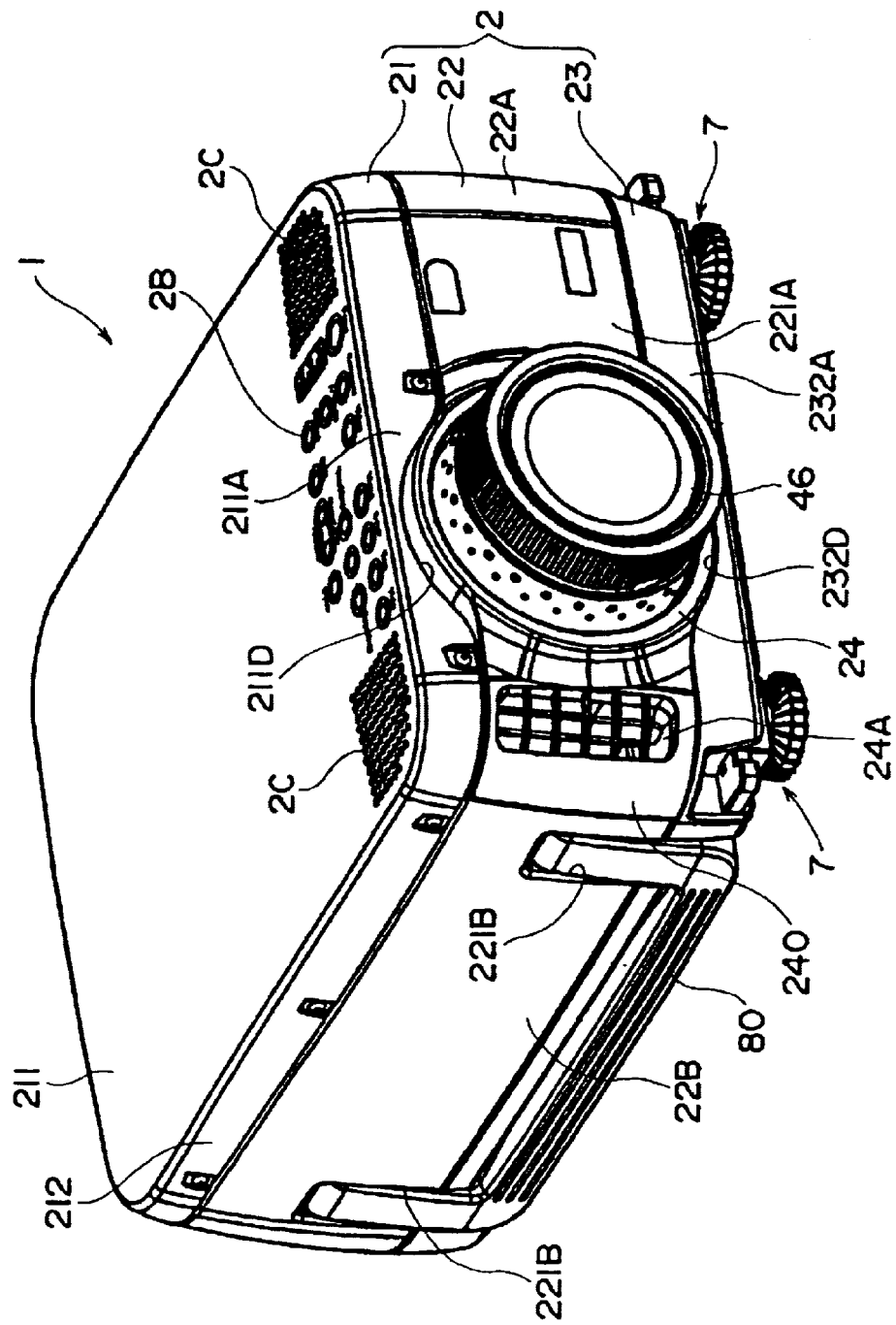
FIG. 1 is an entire perspective view showing a projector according to an embodiment of the present invention seen from above.
Figure 2:
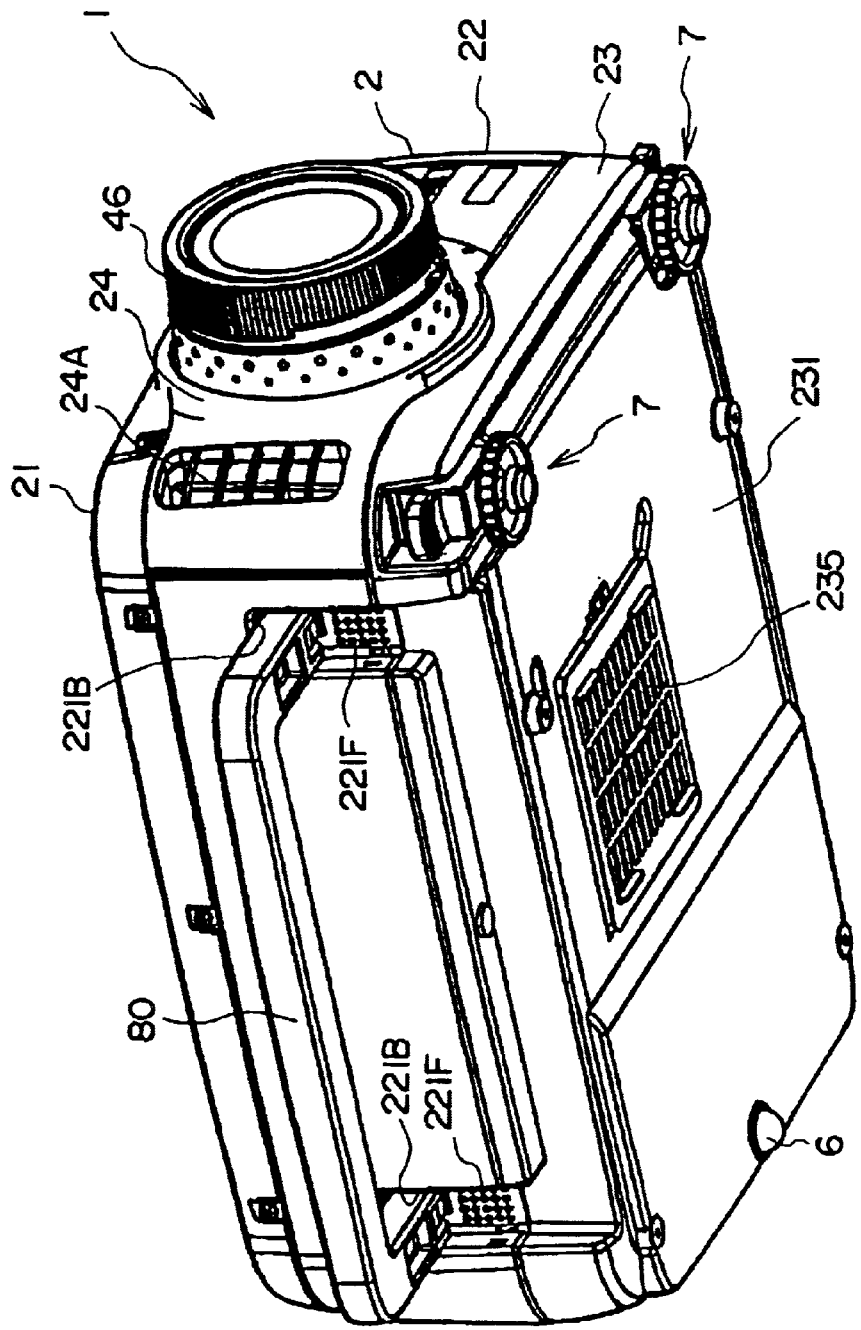
FIG. 2 is an entire perspective view of the projector according to the aforesaid embodiment seen from below.
Figure 3:
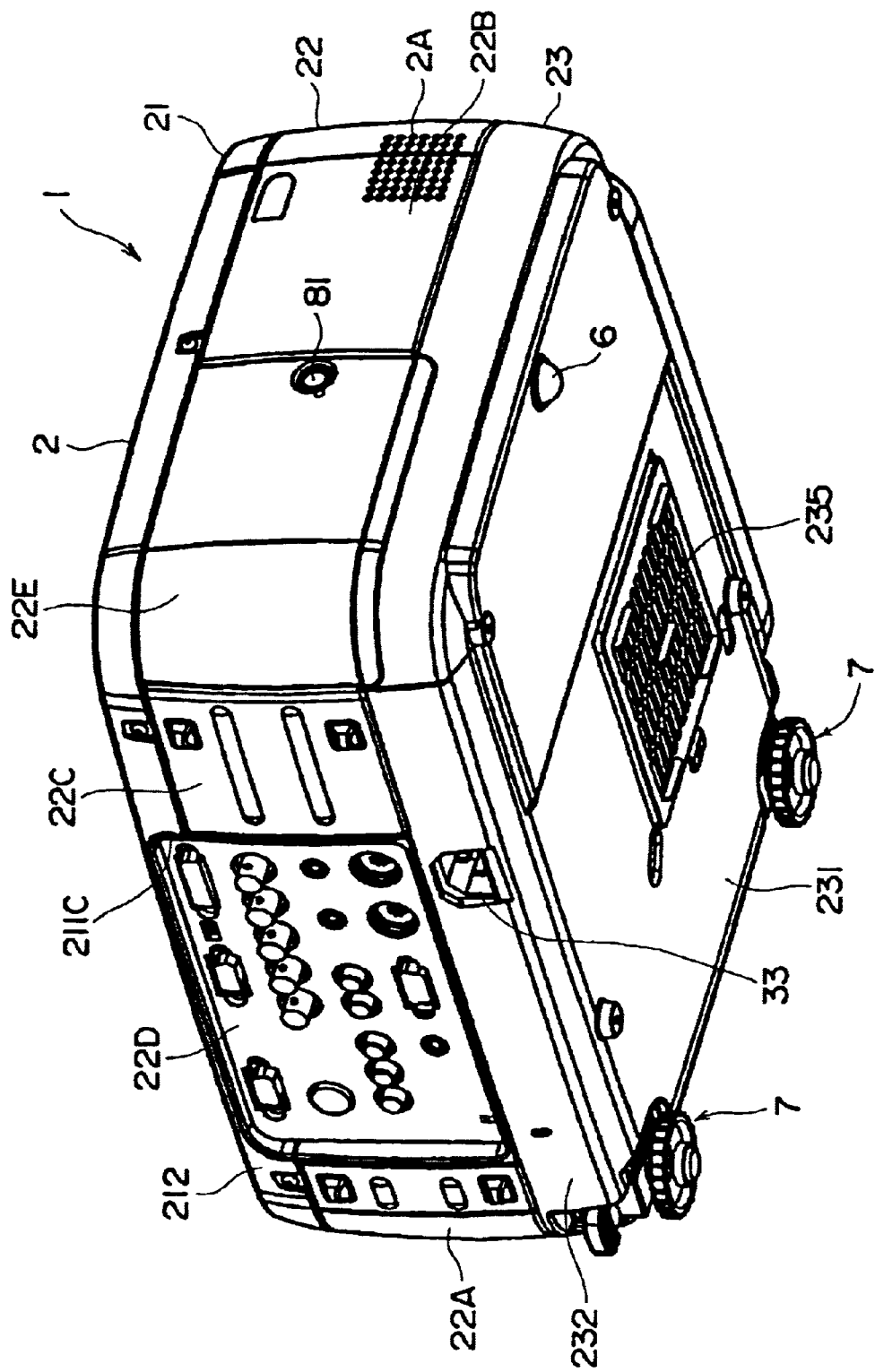
FIG. 3 is an entire perspective view of the projector according to the aforesaid embodiment seen from below.
Figure 4:
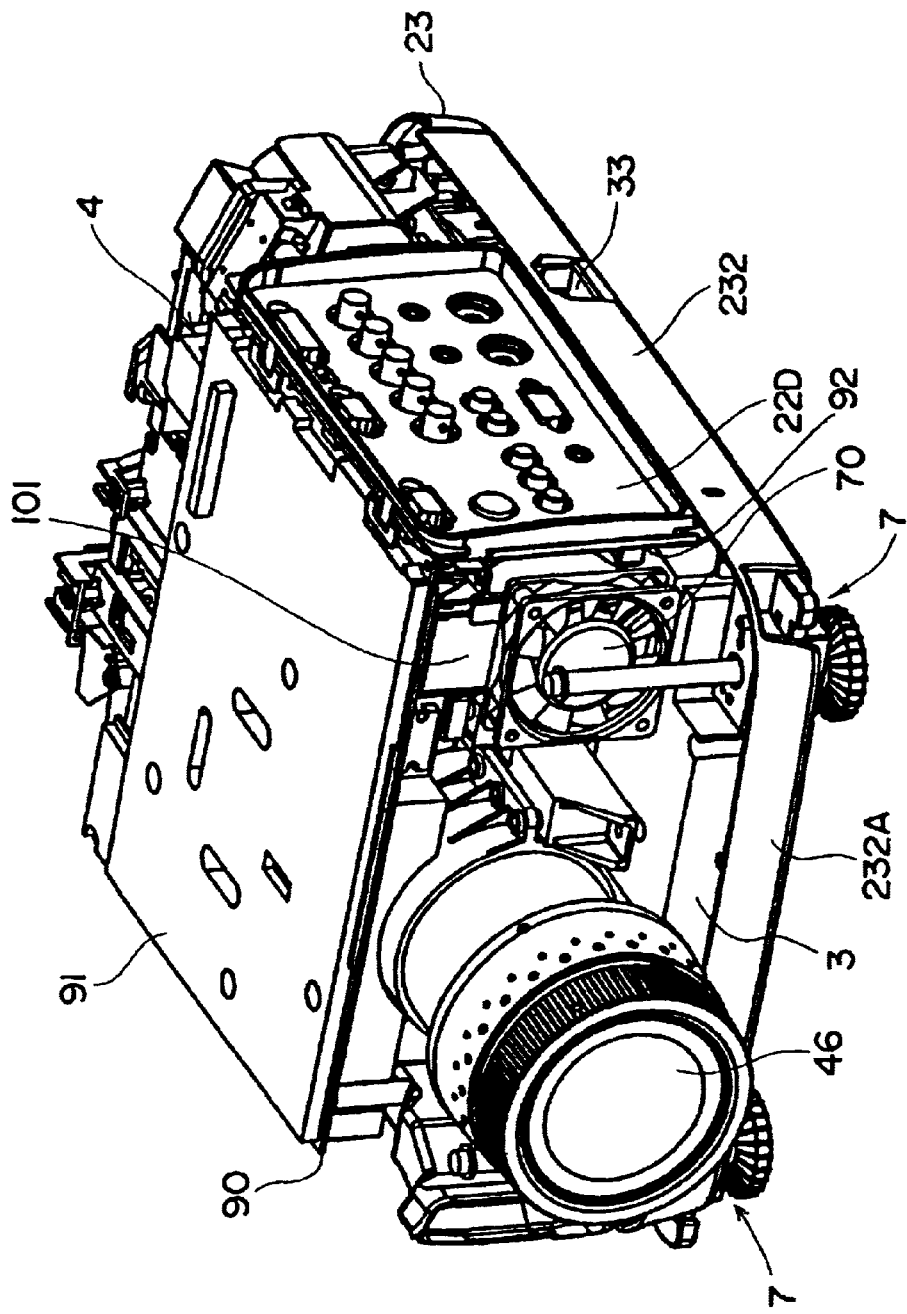
FIG. 4 is an entire perspective view showing an inside of the projector of the aforesaid embodiment.

FIG. 1 is an entire perspective view showing a projector 1 according to the present embodiment seen from above, FIGS. 2 and 3 are entire perspective views showing the projector 1 and FIG. 4 is a perspective view showing an inside of the projector 1 seen from below.

A projector 1 separates a light beam irradiated from a light source into three primary colors of red (R), green (G) and blue (B), modulates the light beams of respective colors in accordance with image information through the liquid crystal panel as an optical modulator constituting an electric optical device and synthesizes the modulated light beams of respective colors by a cross dichroic prism to enlarge and display the beam on a projecting surface through a projection lens 46. Though respective components are accommodated in an exterior case 2, the projection lens 46 is protrudable and retractable from the exterior case 2 by a zoom mechanism thereof as necessary.

In FIGS. 1 to 4, the projector 1 has the exterior case 2 as a casing, a power supply unit 3 accommodated in the exterior case 2, and an optical unit 4 of planarly L-shape disposed in the exterior case 2, the entirety of the projector 1 being approximate rectangular solid.

The exterior case 2 includes a sheet-metal upper case 21 covering upper side of the device, a lower case 23 made of die casting such as magnesium constituting the bottom of the device, and a middle case 22 made of aluminum or bent steel plate disposed between the upper case 21 and the lower case 23 to cover the sides of the device.

The upper case 21 is formed of an upper portion 211 and a side portion 212 disposed around the upper portion 211, which is, for instance, shaped by a press using a die. A circular hole 211D corresponding to a lens attachment frame 24 for attaching the projection lens 46 is provided to a front portion 211A side of the side portion 212, the neighborhood of the circular hole 211D being curved inwardly by drawing. A notch 211C (see FIG. 3) is formed on a side orthogonal with the front portion 211A of the side portion 212.

A manipulation switch 2B for adjusting image quality of the projector 1 is provided to the projection lens 46 side of the upper portion 211 of the upper case 21. A number of holes 2C for speaker is provided on both sides of the manipulation switch 2B.

The middle case 22 is, as described above, formed by bending aluminum plates etc., which includes a fist case member 22A and a second case member 22B disposed on both sides of the projection lens 46, and a third case member at the back of the first case member 22A. An interface exposed member 22D exposing various connectors for the interface provided on an interface substrate 92 disposed inside the middle case 22 is disposed and connected and an openable and closable lamp cover 22E is provided between the second case member 22B and the third case member 22C.

The respective case members 22A, 22B and 22C have a configuration capable of combined with the upper case 21 and the lower case 23 by bending the aluminum plates having a predetermined configuration blanked by a press or a machining center.

An opening (not shown) corresponding to the lens attachment frame 24 is formed between a front 221A formed on a front side of the first case member 22A and the second case member 22B. Another opening (not shown) is formed on the front 221A side of the second case member 22B, which opposes an exhaust hole 24A formed on the lens attachment frame 24.

The lens attachment frame 24 is attached to the middle case 22 to form the middle case 22. Incidentally, a cover 240 made of, for instance, plastic, is attached around the exhaust hole 24A.

Handle openings 221B extending from the lower case 23 toward the upper case 21 by a predetermined distance spaced apart with each other are provided to the second case member 22B. A handle 80 used in carrying the projector 1 is attached to the openings 221B.

As shown in FIG. 3, the lamp cover 22E has a knob 81 such as a screw on the second case member 22B side and is engaged to the peripheral end of the third case member 22C. The knob 81 is screwed to a nut (not shown) formed on the second case member 22B through an E ring. When the knob 81 is rotated to release screwing with the nut, the knob 81 projects to the outside from the lamp cover 22E by the amount being screwed. When the knob 81 is held to slide the lamp cover 22E along the side of the projector 1, the lamp cover 22E can be detached. Incidentally, since the knob 81 is supported by the E ring, the knob 81 is not detached from the lamp cover 22E even after releasing to screw with the nut.

As mentioned above, the lower case 23 is a die-casting of magnesium etc., where an approximately rectangular bottom portion 231 and a side portion 232 around the bottom portion are integrally formed. A reinforcing rib etc. is formed at a predetermined location inside the lower case 23, thereby securing strength of the entire lower case 23.

A height position adjuster 7 for adjusting inclination of the entire projector 1 to adjust position of the projected image is provided on both corners of front side of the bottom portion 231 of the lower case 23. On the other hand, a resin-made foot member 6 (FIG. 2) is fitted to the rear center of the bottom portion 231. Incidentally, the height position adjuster 7 advances and retracts in protruding direction by rotating the dial portion or manipulating lever thereof, the advancement retraction being adjusted to change height and inclination of the displayed screen.

A fan cover 235 is attached to the bottom portion 231 of the lower case 23. A circular hole 232D corresponding to the lens attachment frame 24 is provided to a front portion 232A of the lower case 23.

An intake hole 2A for introducing cooling air to the inside, an exhaust hole 24A for exhausting the air after cooling, the manipulation switch 2B, the multiple holes 2C corresponding to positions of the speaker and the handle opening 221B are provided to the exterior case 2. Incidentally, the cooling air is introduced to the inside from the handle opening 221B.

As shown in FIG. 4, the power unit 3 is composed of a power supply (not shown) disposed on the bottom side in the exterior case 2 and a lamp driving circuit 101 disposed at the back of the power supply. The power supply supplies the electric power supplied through the power cable to the lamp driving circuit 101 and a driver board (not shown), which includes an inlet connector 33 for the power cable to be plugged (FIG. 4), an aluminum frame surrounding the power supply and a power circuit.

The lamp driving circuit supplies the electric power to a source lamp 411 (FIG. 5) as a light source of the optical unit 4. An axial flow intake fan 70 as a cooling fan for introducing the air into the inside of the projector 1 is provided to the front side of the lamp driving circuit 101.

Figure 5:
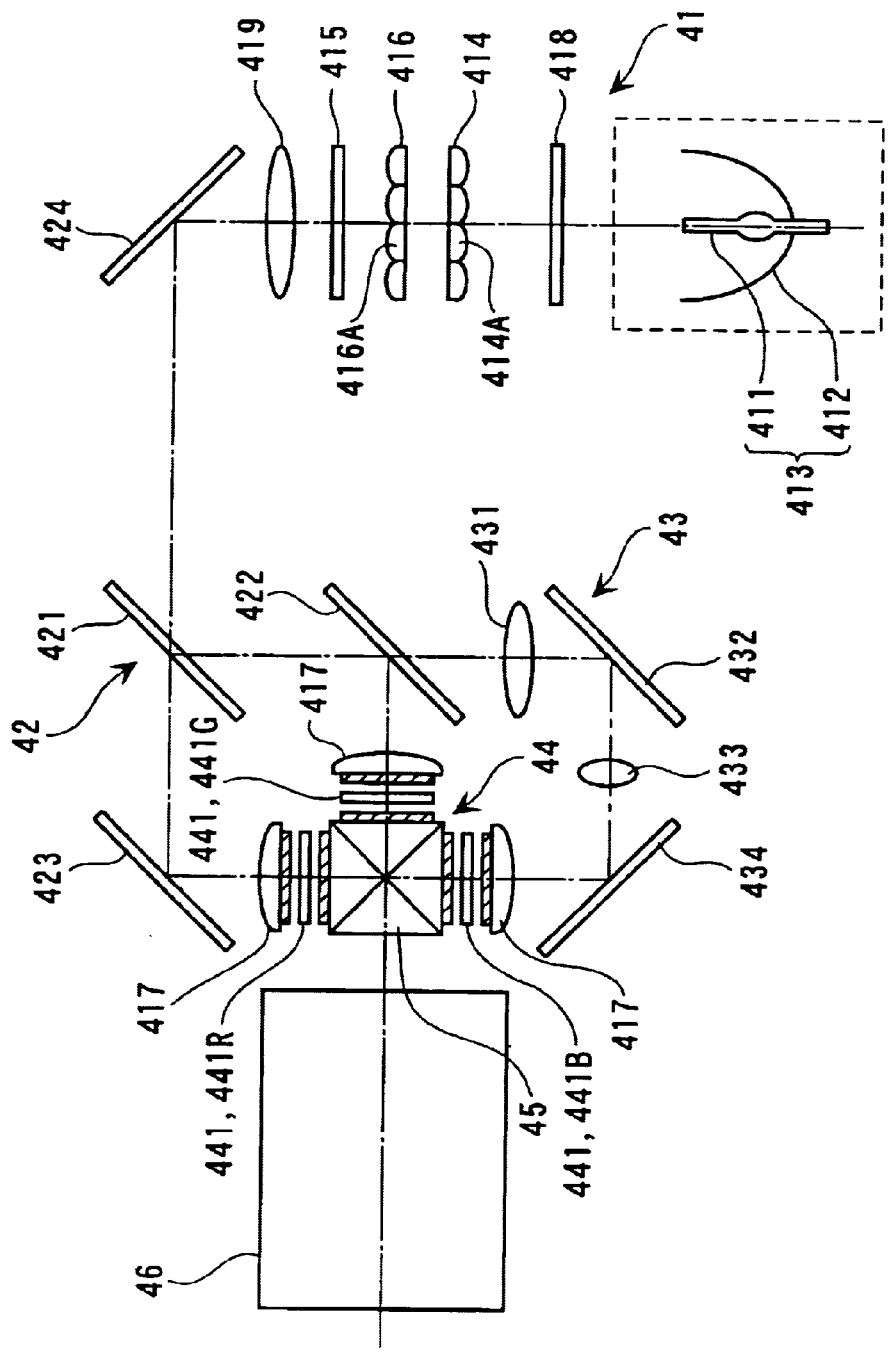
FIG. 5 is a plan view schematically showing respective optical systems of projector of the aforesaid embodiments.

As shown in FIG. 5, the optical unit optically processes the light beam irradiated from the source lamp 411 to form an optical image corresponding to the image information, which includes an integrator illuminating optical system 41, a color separating optical system 42, a relay optical system 43, an electric optical device 44, a cross dichroic prism 45 as a color synthesizing optical system and a projection lens 46 as a projection optical system.

2. Detailed Arrangement of Optical System

In FIG. 5, the integrator illuminating optical system 41 is an optical system for substantially uniformly illuminating the image formation areas of the three liquid crystal panels 441 (respectively represented as liquid crystal panels 441R, 441G and 441B for each color light of red, green and blue), which includes a light source 413, a UV filter 418, a first lens array 414 as a beam splitter, a second lens array 416, a polarization converter 415, a superposing lens 419 and a reflection mirror 424.

The light source 413 constituting the integrator illuminating optical system 41 has the source lamp 411 as a radial light source for emitting radial light beam and a reflector 412 for reflecting the radial light emitted from the source lamp 411. A halogen lamp, a metal halide lamp, or a high-pressure mercury lamp is often used as the source lamp 411. A parabolic mirror is used as the reflector 412, however, an ellipsoidal mirror and a parallelizing lens (concave lens) may be used.

The first lens array 414 has a matrix arrangement of lenses 414A having substantially rectangular profile viewed from optical axis direction. The respective lenses 414A split the beam emitted from the source lamp 411 to pass the UV filter 418 into a plurality of partial light beams. The profile of the respective lenses 414A is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 416 has approximately the same arrangement as the first lens array 414, where the lenses 416A is disposed in matrix. The second lens array 416 focuses the image from the respective lenses 414A of the first lens array 414 onto the liquid crystal panel 441 as well as the superposing lens 419.

The polarization converter 415 is disposed between the second lens array 416 and the superposing lens 419 for converting the light from the second lens array 416 to a single polarized light in order to enhance utilization efficiency of the light in the electric optical device 44.

Specifically, the respective partial light converted into single polarized light by the polarization converter 415 is substantially superposed on the liquid crystal panels 441R, 441G and 441B of the electric optical device 44 by the superposing lens 419. Since the projector 1 (the electric optical device 44) of the present embodiment using a liquid crystal panel 441 for modulating polarized light can use only single polarized light, approximately half of the light from the source lamp 411 emitting random polarization light of other type cannot be used.

Accordingly, by using the polarization converter 415, all of the emitted light from the source lamp 411 is converted into single polarized light to enhance utilization efficiency of the light in the electric optical device 44. Incidentally, such polarization converter 415 is disclosed in, for instance, Japanese Patent Laid-Open publication No. Hei 8-304739.

The color separating optical system 42 has two dichroic mirrors 421 and 422 and a reflection mirror 423, where the mirrors 421 and 422 separates the plurality of partial light beam irradiated from the integrator illuminating optical system 41 into three color lights of red, green and blue.

The relay optical system 43 includes an incident-side lens 431, a relay lens 433 and a reflection mirrors 432 and 434, which introduces blues light of the color lights separated by the color separating optical system 42 into the liquid crystal panel 441B.

At this time, the blue color light component and the green light component of the light beam irradiated from the integrator illuminating optical system 41 is reflected by the dichroic mirror 421 of the color separating optical system 42 and the red color light component transmits through the dichroic mirror 421. The red color light transmitted through the dichroic mirror 421 is reflected by the reflection mirror 423, which reaches to the liquid crystal panel 441R for red-color through a field lens 417. The field lens 417 converts the respective partial light beam emitted from the second lens array 416 into a light beam parallel to central axis (main beam). The field lenses 417 provided in front of the other liquid crystal panels 441G and 441B function in the same manner.

In the blue light and the green light reflected by the dichroic mirror 421, the green light is reflected by the dichroic mirror 422 to reach the liquid crystal panel 441B for green color through the field lens 417. On the other hand, the blue color transmits through the dichroic mirror 422 to pass the relay optical system 43 and reach the liquid crystal panel 441B for blue color through the field lens 417. Incidentally, the relay optical system 43 is used for the blue color in order to prevent decrease in utilization efficiency of light on account of light diffusion because the length of the optical path of the blue color light is longer than the length of the optical path of the other color lights, in other words, in order to directly transmit the partial light beam incident on the incident-side lens 431 to the field lens 417.

The electric optical device 44 has the liquid crystal panels 441R, 441G and 441B as three optical modulators which, for instance, use a polysilicon TFT as switching element. The color lights separated by the color-separating optical systems 42 is modulated by the three crystal panels 441R, 441G and 441B in accordance with image information to form optical image.

The cross dichroic prism 45 synthesizes the images modulated for respective color lights irradiated from the three liquid crystal panels 441R, 441G and 441B to form a color image. Incidentally, a dielectric multilayer film for reflecting red light and another dielectric multiplayer film for reflecting blue light are formed on the prism 45 along boundaries of the four right-angled prisms, the dielectric multilayers synthesizing three color lights. The color image synthesized by the prism 45 is irradiated from the projection lens 46 and is enlarged and projected on a screen.

Figure 6:
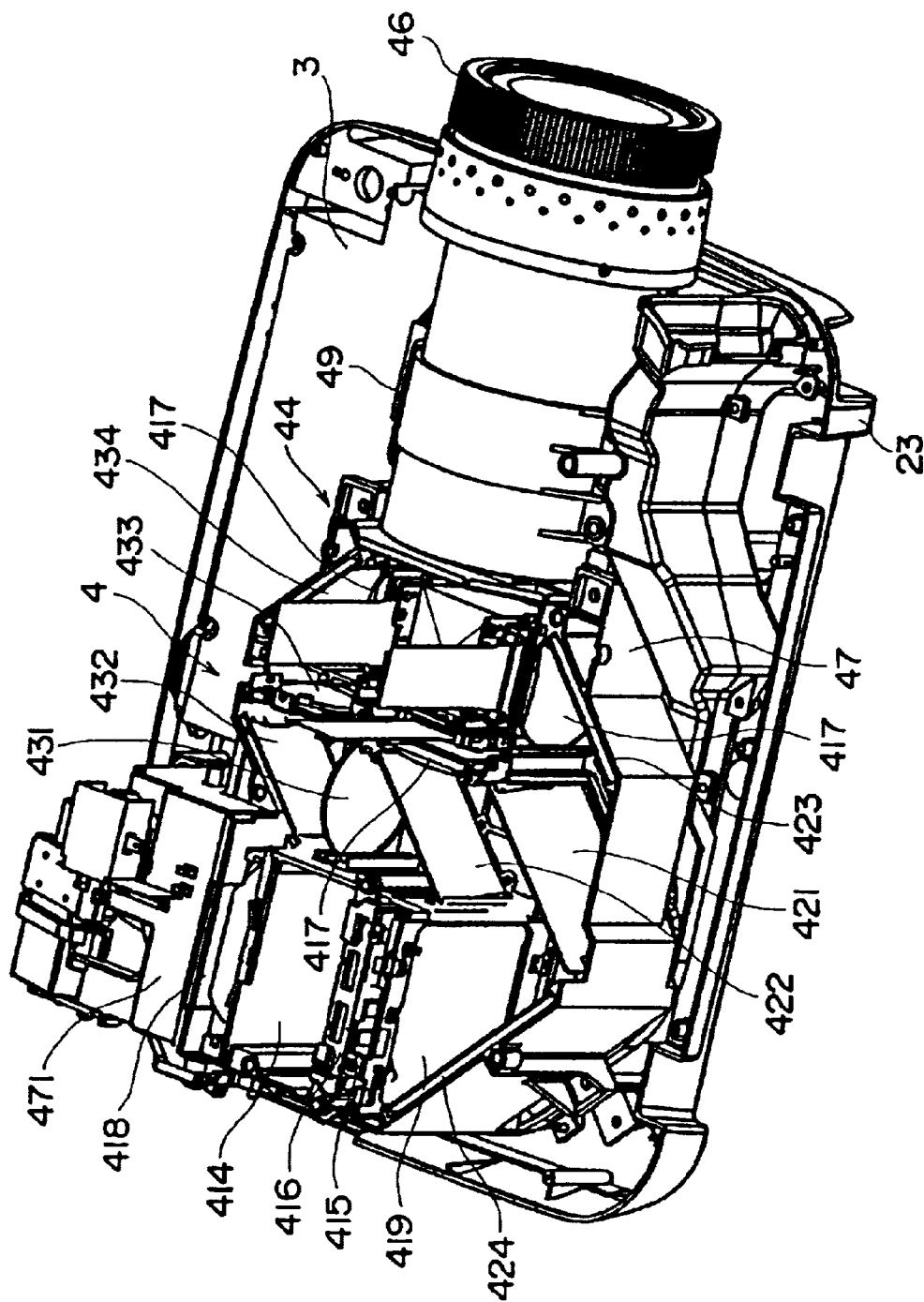
FIG. 6 is a perspective view showing components of the projector of the aforesaid embodiment.

The above-described respective optical systems 41 to 45 are disposed on a lower side of a main board 90 covered with a shield plate 91 as shown in FIGS. 4 and 6 and is accommodated in a inner case 47 (FIG. 6) as an optical component casing of synthetic resin. Specifically, the lower inner case 47 is provided with a groove for slidably fitting the respective optical components 414 to 419, 421 to 424 and 431 to 434 from upper direction as well as a light source protector 471 for covering the light source 413.

A head portion 49 is formed on the light-irradiating side of the lower inner case 47. The prism 45 attached with the liquid crystal panels 441R, 441G and 441B is fixed to one end of the head portion 49 and the projection lens 46 is fixed to a flange along semi-cylindrical portion of the other end.

3. Structure of Light Source

Figure 7:
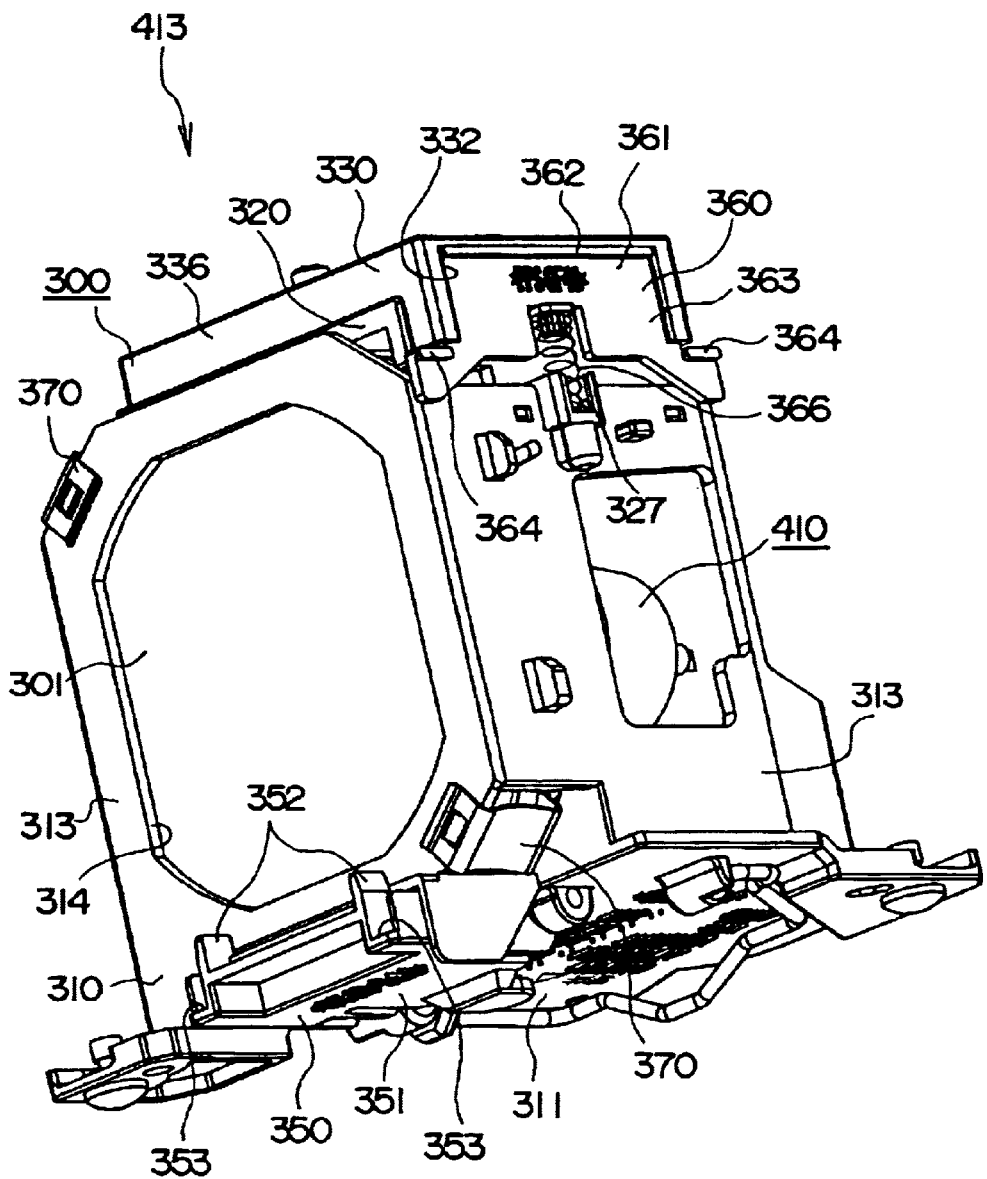
FIG. 7 is a perspective view showing a light source of the aforesaid embodiment.
Figure 8:
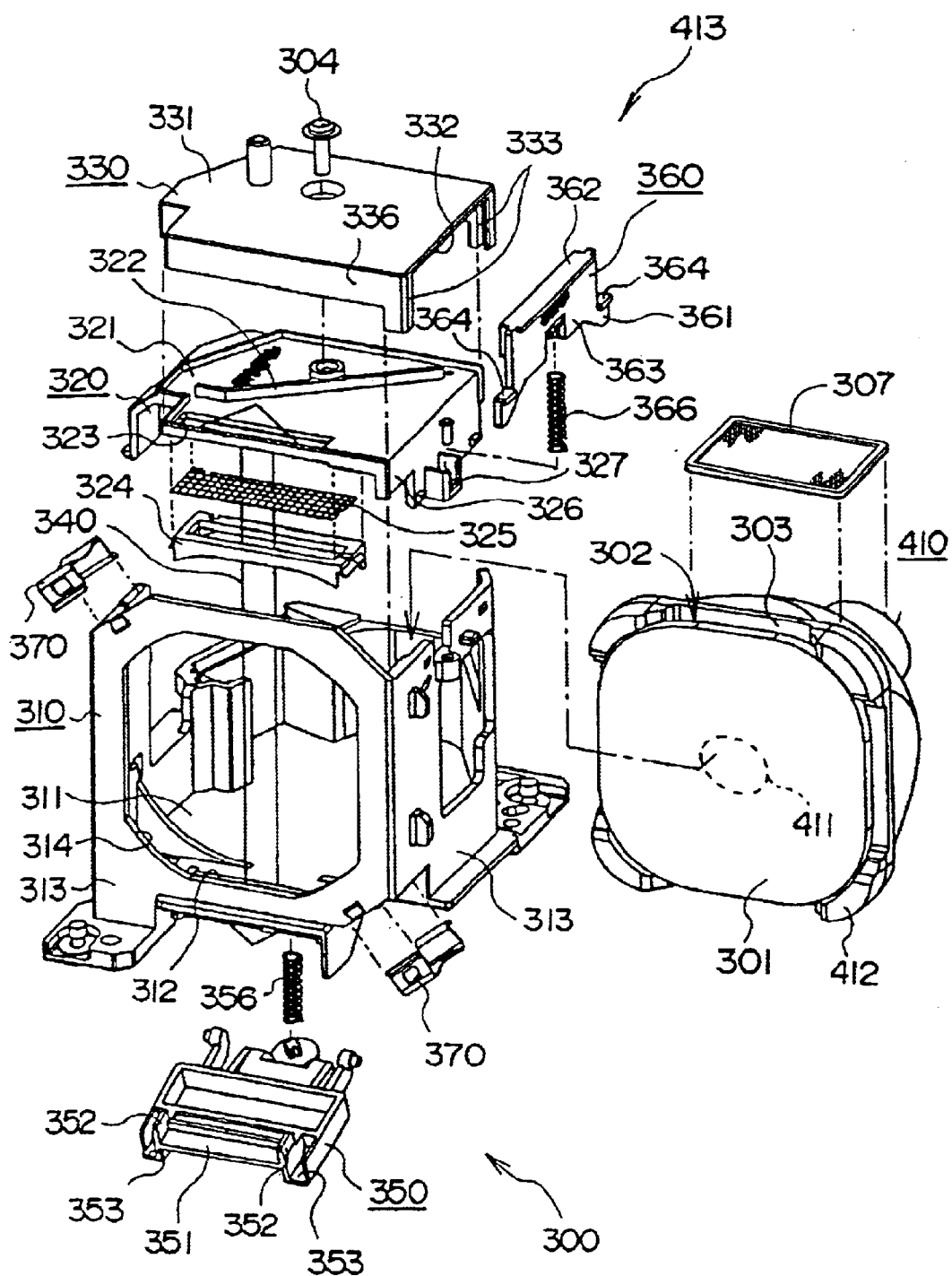
FIG. 8 is an exploded perspective view showing a light source of the aforesaid embodiment.

As shown in FIGS. 7 and 8, the light source 413 has a lamp body 410 and a case 300 for accommodating the lamp body 410 and is attachable and detachable to the light source protector 471 of the projector 1.

The lamp body 410 has the source lamp 411 and the reflector 412 for aligning and emitting the light irradiated from the source lamp 411.

The light-emitting surface of the reflector 412 is covered with a light-transmissive plate 301 such as a glass plate. A pair of openings 302 symmetrically disposed around the optical axis of the reflector 412 is formed on the contact surface of the light-transmissive plate 301 and the reflector 412. The pair of openings 302 are respectively composed of a recess 303 formed on the distal portion in the light-emitting direction of the reflector 412. A dust filter 302a is respectively provided on the pair of openings 302. Accordingly, a cooling channel 340 is formed in the lamp body 410 to cool the source lamp 411.

The case 300 has a positioning surface for locating the source lamp 411 and the reflector 412 in the optical axis direction of the emitted light and in a direction orthogonal with the optical axis, which further includes a case body 310 with a part thereof being opened, a first lid member 320 and a second lid member 330 for shutting the opening of the case body 310, the cooling channel 340 for introducing cooling air to the source lamp 411 through the pair of openings 302, and a first cooling channel shutter 350 and a second cooling channel shutter 360 for shutting the cooling channel 340 when being detached from the projector 1 and for opening the cooling channel 340 when being attached to the projector 1.

The case body 310 accommodates the lamp body 410, which includes a bottom portion 311 for the lamp body 410 to be mounted and a side portion 313 perpendicularly rising from the periphery of the bottom portion 311 and has approximate C-shape cross section.

An opening 314 for the light-transmissive plate 301 to be exposed is formed on a part of the side portion 313.

When the lamp body 410 is accommodated in the case body 310, the periphery of the reflector 412 is brought into contact with the side portion 313 formed with the opening 314 and the periphery of the reflector 412 and the side portion 313 are held from outside by a clip 370, so that the lamp body 410 is secured to the case body 310.

An opening 312 for in communication with the inside and the outside of the case body 310 is formed on the bottom portion 311 at a position corresponding to the position to which the below-described first cooling channel shutter 350 is attached.

The first lid member 320 directly shuts the opening of the case body 310, which includes a lid body 321 attached to a side opposite to the bottom portion 311 and an extension 326 extending from the end portion of the lid body 321 toward the case body 310 and has an approximate C-shape cross section. The lid body 321 is formed in approximate trapezoid plane, and has a square pillar guide plate 322 for guiding the cooling air on the upper side thereof. A square opening 323 is formed adjacent to a side of the lid body 321 (near side in FIG. 8). A frame 324 having approximately the same size as the opening 323 is provided on a position corresponding to the opening 323. A mesh filter 325 is interposed between the frame 324 and the lid body 321.

In the two extensions 326, the right (in FIG. 8) extension 326 has a recess 327 having an opening directed upward on a central side portion thereof.

The second lid member 330 covers the first lid member 320, which includes a cover 331 for covering the lid body 321 of the first lid member 320 and an extension 336 extending toward the lid body 321 and is secured to the first lid member 320 by a screw 304.

A side of the second lid member 330 opposite to the recess 327 has a recess 332 formed in a C-shape and dented downward and a groove 333 on the opposing sides of the inner side. The recess 332 is arranged to be an opening when the second lid member 330 is superposed on the first lid member 320.

The second lid member 330 floats in upper direction for the height dimension of the guide plate 322 in being attached to the first lid member 320. In other words, a gap is formed between the first lid member 320 and the second lid member 330. Accordingly, the air in the cooling channel 340 in the case 300 and the air outside the case 300 can be exchanged by the gap. Therefore, the gap is a duct for guiding the air from the outside of the case 300 to the cooling channel 340 and/or from the cooling channel 340 to the outside of the case 300.

The first cooling channel shutter 350 is rotatably supported to the case body 310, which includes a lid member 351 formed on the case body 310 for shutting the opening 312 and a coil spring 356 as a biasing member for biasing the lid member 351 in rotary direction.

The lid member 351 is formed in a box-shape, and a pair of claws 352 projecting toward the case body 310 is formed on both side peripheries thereof.

A recess 353 for a below-described first projection 475 to be inserted is formed between the claw 352 and the side surface.

Figure 9:
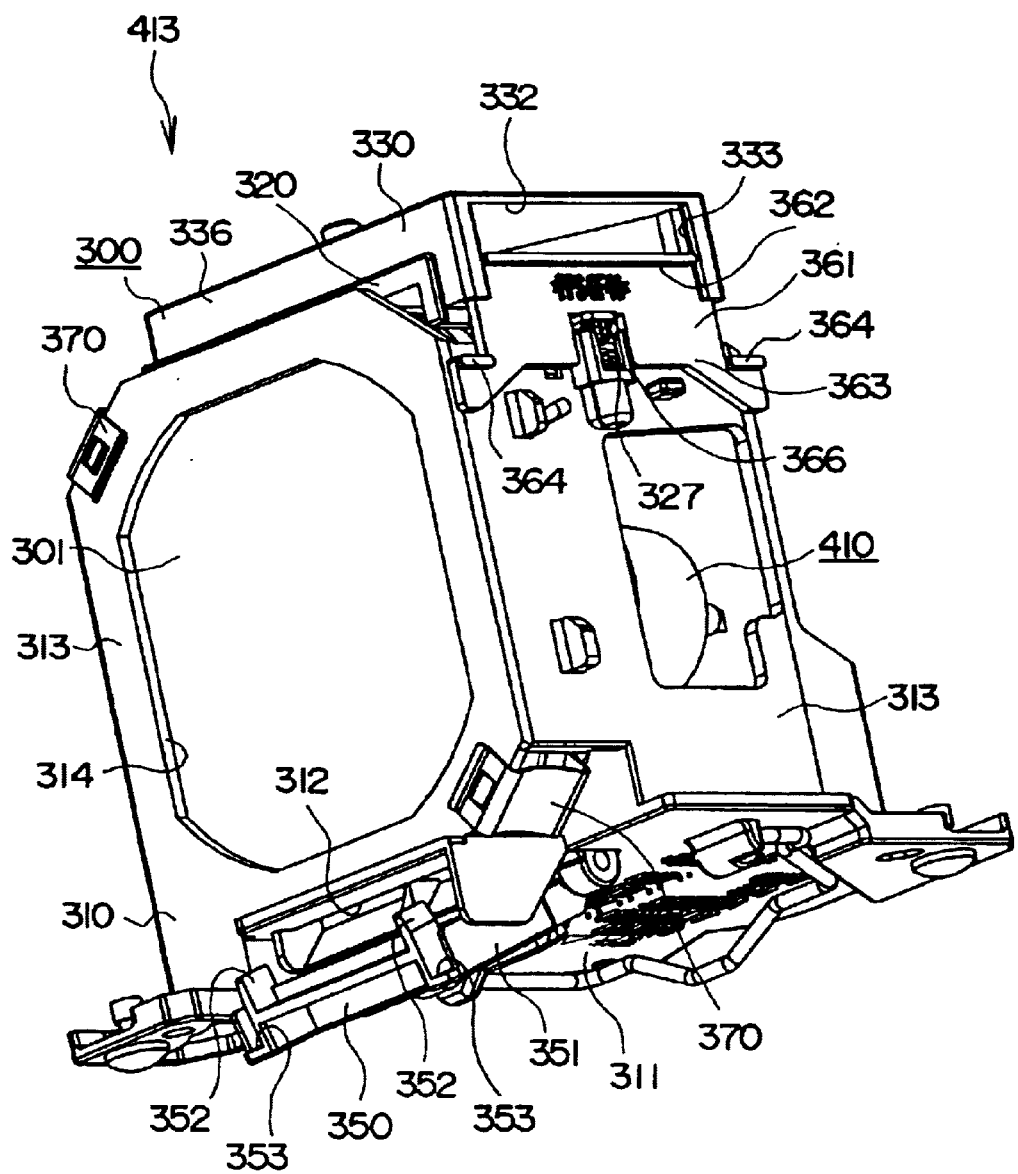
FIG. 9 is a perspective view showing a light source of the aforesaid embodiment.

Accordingly, as shown in FIG. 9, when the recess 353 is pushed in a direction away from the case body 310 for instance, the lid member 351 is opened, so that the cooling air is introduced into or discharged from the opening 312. On the other hand, when a hand is released from the pushed recess 353, the lid member 351 automatically shuts the opening 312 by virtue of the biasing force of the coil spring 356.

The second cooling channel shutter 360 is slidably supported to the case body 310, which includes a lid member 361 for shutting the opening formed by the recess 332 of the second lid member 330 and a coil spring 366 as a biasing member for biasing the lid member 361 in a slide direction.

The lid member 361 has a plate-shaped contact portion 362 to be in contact with a horizontal portion of the recess 332 and a periphery fitted to the groove 333 and includes a slide portion 363 orthogonal with the backside of the contact portion 362 for sliding along the case body 310 and a claw 364 to be in contact with the distal end of the extension 336, which is shaped in approximate T-shape cross section and approximate square front side.

The coil spring 366 has one end attached to the lid member 361 and the other end inserted and secured to the recess 927 formed on the extension 326 of the first lid member 320.

Accordingly, as shown in FIG. 9, when the claw 364 is pushed toward the case body 310, the lid member 361 is opened and the opening between the first lid member 361 and the second lid member 330 emerges to discharge or introduce the cooling air. On the other hand, when the hand is released from the pushed claw 364, the lid member 361 automatically shuts the opening by the biasing force of the coil spring 366.

Figure 10:
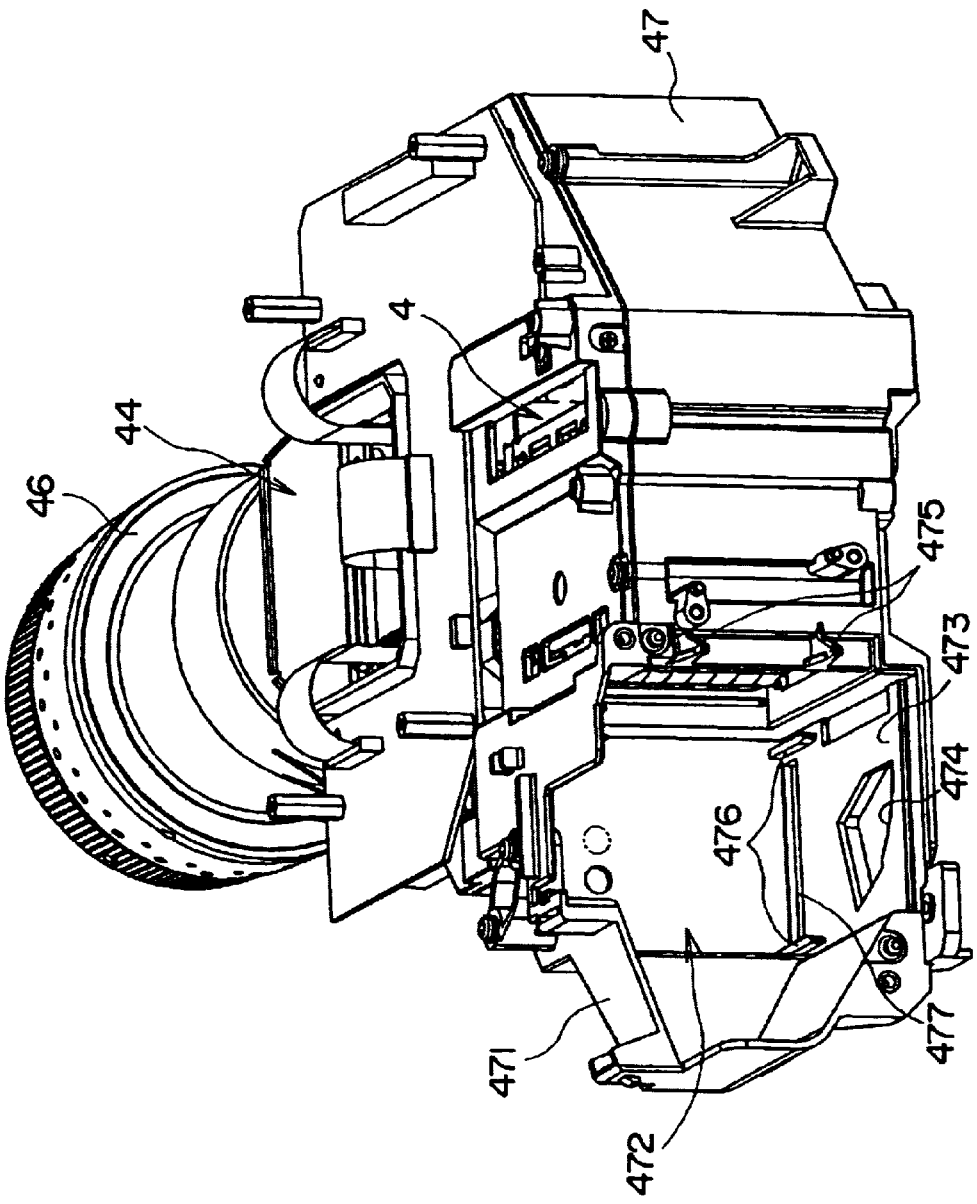
FIG. 10 is an illustration showing a light source protector of the aforesaid embodiment.

Such light source 413 is attachable and detachable relative to the light source protector 471, as shown in FIG. 10.

The light source protector 471 has an accommodating portion 472 having approximately the same shape as the light source 413 thereinside, and is formed in a box-shape with a side opposite to the projection lens 46 being opened.

In FIG. 10, the light source 413 is accommodated in the accommodating portion 472 from the second lid member 330 with the opening 314 of the case body 310 disposed on the right side. In other words, the bottom portion 311 of the case body 310 is exposed to the outside. Further, the light source 413 is accommodated in the accommodating portion 472 while the opening 314 of the case body 310 is disposed on the right side and is detached in this condition so that the pair of openings 302 formed on the lamp body 410 is horizontally disposed.

A pair of first projections 475 is formed on the periphery of the opening of the inner case 47, the first projections 475 being inserted to the recess 353 of the first cooling channel shutter 350 and pushing up the recess 353 when the light source 413 is fitted to the accommodating portion 472.

Further, a pair of second projections 476 being in contact with the claw 364 of the second cooling channel shutter 360 and pushing up the claw 364 when the light source 413 is fitted to the accommodating portion 472 and an opening 477 being in communication with an air intake of a sirocco fan (not shown) as a centrifugal fan disposed below the bottom surface 473 are formed on the bottom surface 473 of the accommodating portion 472.

The opening 477 opposes an opening between the first lid member 320 and the second lid member 330 when the light source 413 is accommodated in the accommodating portion 472. The opening 474 formed in front of the opening 477 is an opening for the air around the outside of the light source 413 to be flowed in, which can take in substantially low temperature air as compared to the temperature inside the reflector 412.

Figure 11A:
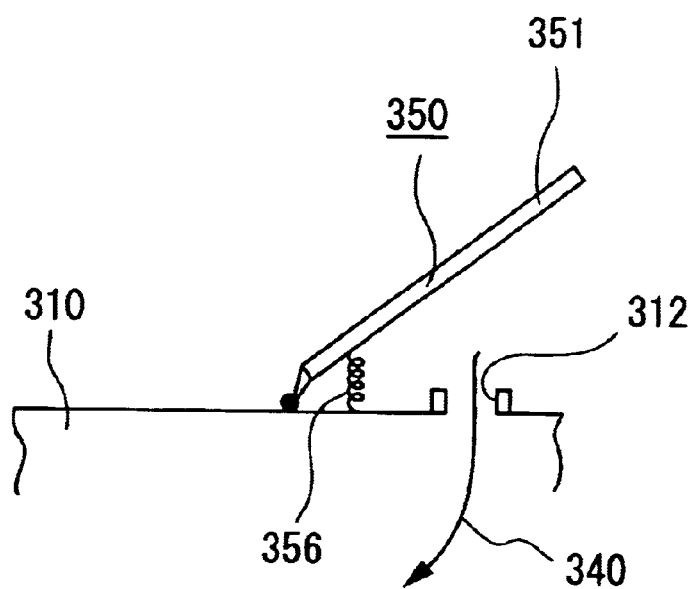
FIGS. 11(A) and 11(B) are schematic views illustrating opening and closing first cooling channel shutter of the aforesaid embodiment.
Figure 11B:
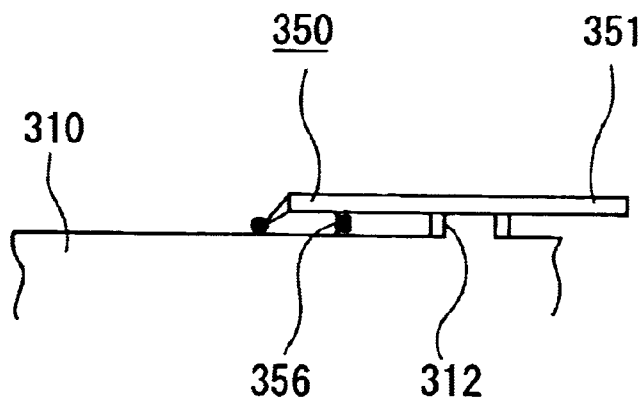

Accordingly, when the light source 413 is accommodated in the accommodating portion 472 (i.e. attached to the projector 1), the first cooling channel shutter 350 is automatically opened by the first projection 475 as shown in FIG. 11(A) to open the cooling channel 340 in the case 300. On the contrary, when the light source 413 is detached from the accommodating portion 472 (detached from the projector 1), the first cooling channel shutter 350 automatically shuts the cooling channel 340 by the biasing force of the coil spring 356 as shown in FIG. 11(B).

Figure 12A:
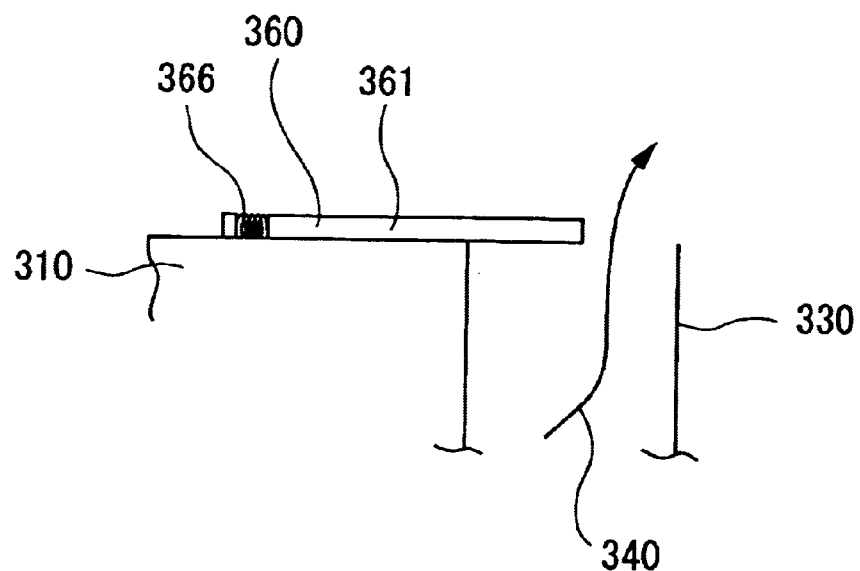
FIGS. 12(A) and 12(B) are schematic views illustrating opening and closing second cooling channel shutter of the aforesaid embodiment.
Figure 12B:
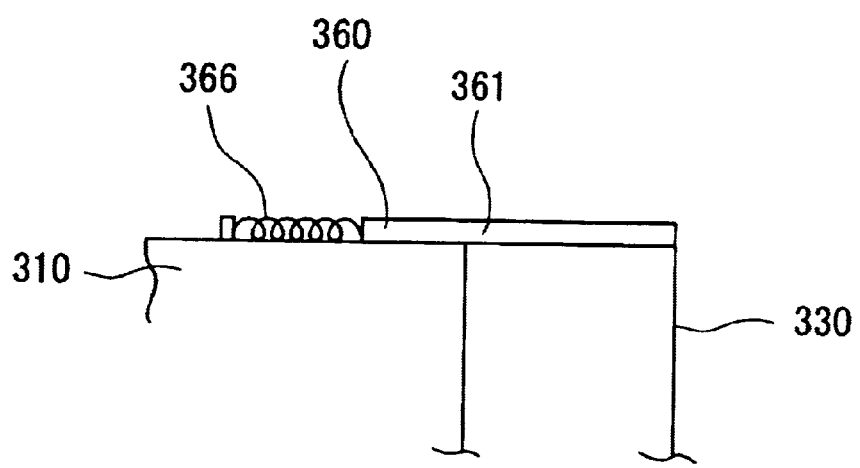

In the same manner, the second cooling channel shutter 360 is automatically opened by the second projection 476 when the light source 413 is accommodated in the accommodating portion 472 (i.e. attached to the projector 1) as shown in FIG. 12(A) to open the cooling channel 340 in the case 300. On the contrary, when the light source 413 is detached from the accommodating portion 472 (i.e. detached from the projector 1), the second cooling channel shutter 360 automatically shuts the cooling channel 340 by the biasing force of the coil spring 366 as shown in FIG. 12(B).

Figure 13:
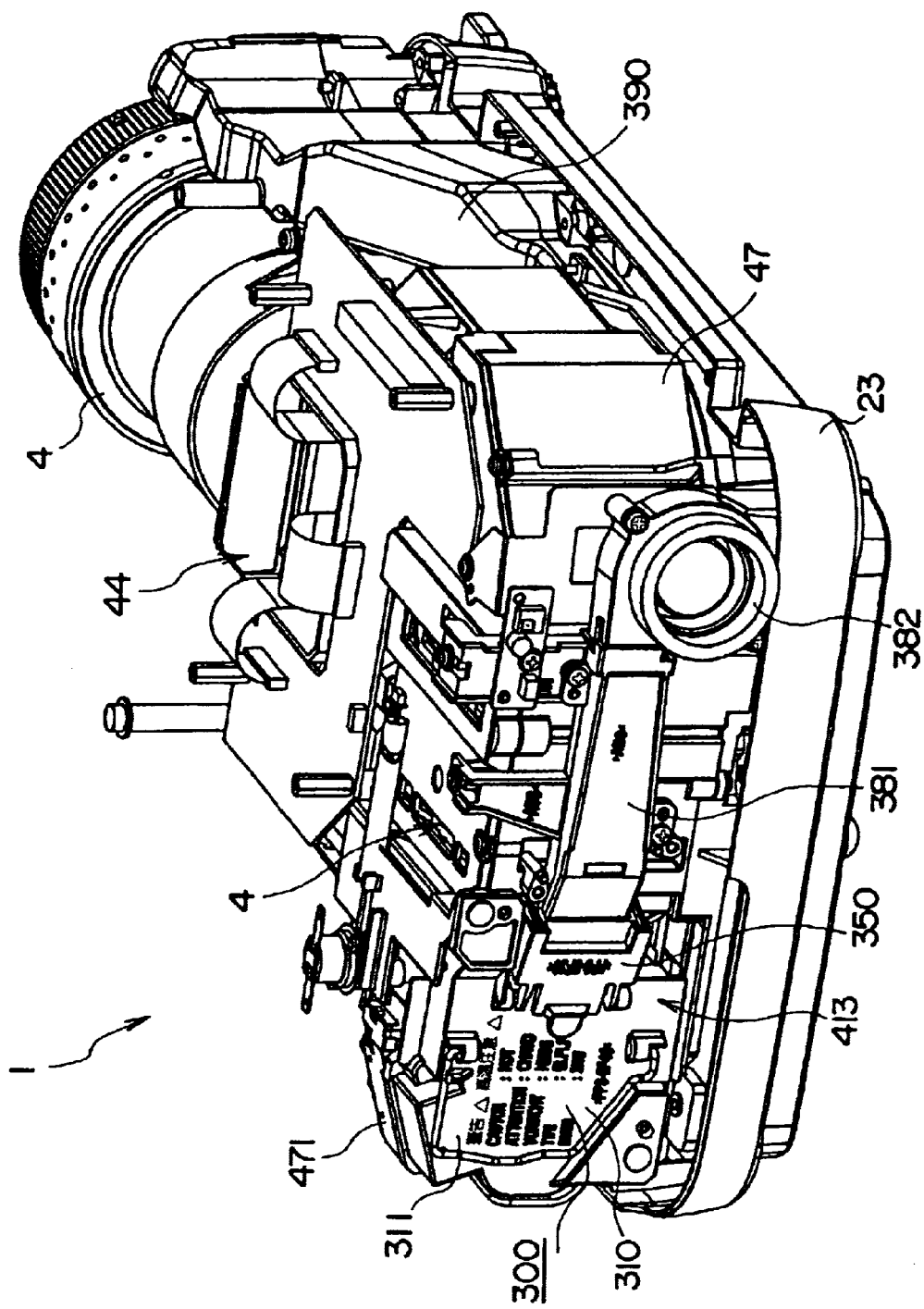
FIG. 13 is a perspective view showing cooling mechanism of the light source of the aforesaid embodiment.

On the other hand, as shown in FIG. 13, the projector 1 has a square pipe duct 381 having an end inserted to the first cooling channel shutter 350 for introducing the cooling air into the light source 413 attached in the accommodating portion 472.

A sirocco fan 382 as a centrifugal fan for transferring the cooling air is provided on the base end of the duct 381 (opposite to the first cooling channel shutter 350).

Accordingly, the cooling air in the light source 413 provided with the sirocco fan 382 and the duct 381 flows through the cooling channel 340 from the first cooling channel shutter 350 to the second cooling channel shutter 360. In other words, the opening 312 of the case body 310 is an air-introducing opening and the opening opened and closed by the second cooling channel shutter 360 is an air-exhausting opening.

Therefore, the cooling air inhaled into the inside of the projector 1 from the above-described intake hole 2A and the handle opening 221B can be securely introduced to the source lamp 411 of the light source 413. The air having cooled the inside of the light source 413 passes the opening 474 formed on the bottom surface 473 of the accommodating portion 472, is inhaled by the sirocco fan and is discharged to the outside of the projector 1 through the exhaust duct 390 connected to the sirocco fan.

According to the present embodiment, following effects can be obtained.

Since the pair of openings 302 is constructed by the recess 303 formed by cutting a part of the peripheral end of the reflector 412 in the light-emitting direction, the cooling air can be flowed in a direction orthogonal with the optical axis of the reflector 412 toward around the source lamp 411 as a heat source, thereby efficiently cooling the source lamp 411.

Since the cooling channel 340 for introducing the cooling air to the source lamp 411 via the pair of openings 302 is provided to the case 300, the source lamp 411 can be efficiently cooled to lengthen the life of the source lamp 411.

Since the first and the second cooling channel shutters 350 and 360 for shutting the cooling channel 340 when being detached from the projector I are provided, even when the light-emitting tube of the source lamp 411 is exploded while using the projector 1, the fragments of the light-emitting tube is not fallen outside in exchanging the light source 413. And since the first and the second cooling channel shutters 350 and 360 open the cooling channel 340 in attaching to the projector 1, the cooling efficiency of the source lamp 411 is not impaired. Further, since the light source 413 is attached so that the pair of openings 302 is disposed in horizontal direction when the light source 413 is detached from the projector 1, the fragments of the light-emitting tube of the source lamp 411 can be further securely prevented from falling out to the outside in exchanging the light source 413.

Since the first and the second cooling channel shutters 350 and 360 are respectively constructed by the lid members 351 and 361 and the coil springs 356 and 366, the shutter for the cooling channel 340 can be provided to the case 300 with a simple structure, thereby facilitating production of the light source 413.

Since a duct is formed between the first lid member 320 and the second lid member 330, the introduction of the cooling air from the outside of the case 300 and the discharge of the after-cooling air toward the outside of the case 300 can be conducted at a position corresponding to the cooling channel 340 in the projector 1, thereby further enhancing the cooling efficiency of the light source 413.

Since a dust filter is respectively provided to the pair of openings 302, even when the light-emitting tube of the source lamp 411 is exploded, the fragments can be prevented from falling out to the outside of the case 300. Further, since the dust filter is provided to the air-introducing opening 302, the invasion of dust into the light source 413 in accordance with introducing the cooling air can be prevented, thereby preventing decrease in luminance caused when the light-emitting tube gets dirty.

In the projector 1 attached with the light source 413, since the duct 381 for introducing the cooling air to the light source 413 is provided, the cooling air in the projector 1 can be securely guided to the inside of the light source 413, thereby further enhancing the cooling efficiency of the light source 413 to lengthen the life of the light source 413.

Since the sirocco fan 382 is provided to the duct 381, the cooling air can be forcibly transferred from the duct 381 to the cooling channel 340, thereby facilitating circulation of the cooling air to further enhance the cooling efficiency of the light source 413.

Incidentally, the scope of the present invention is not restricted to the above-described embodiment but includes other arrangement as long as an object of the present invention can be achieved, which includes following modifications.

Figure 14:
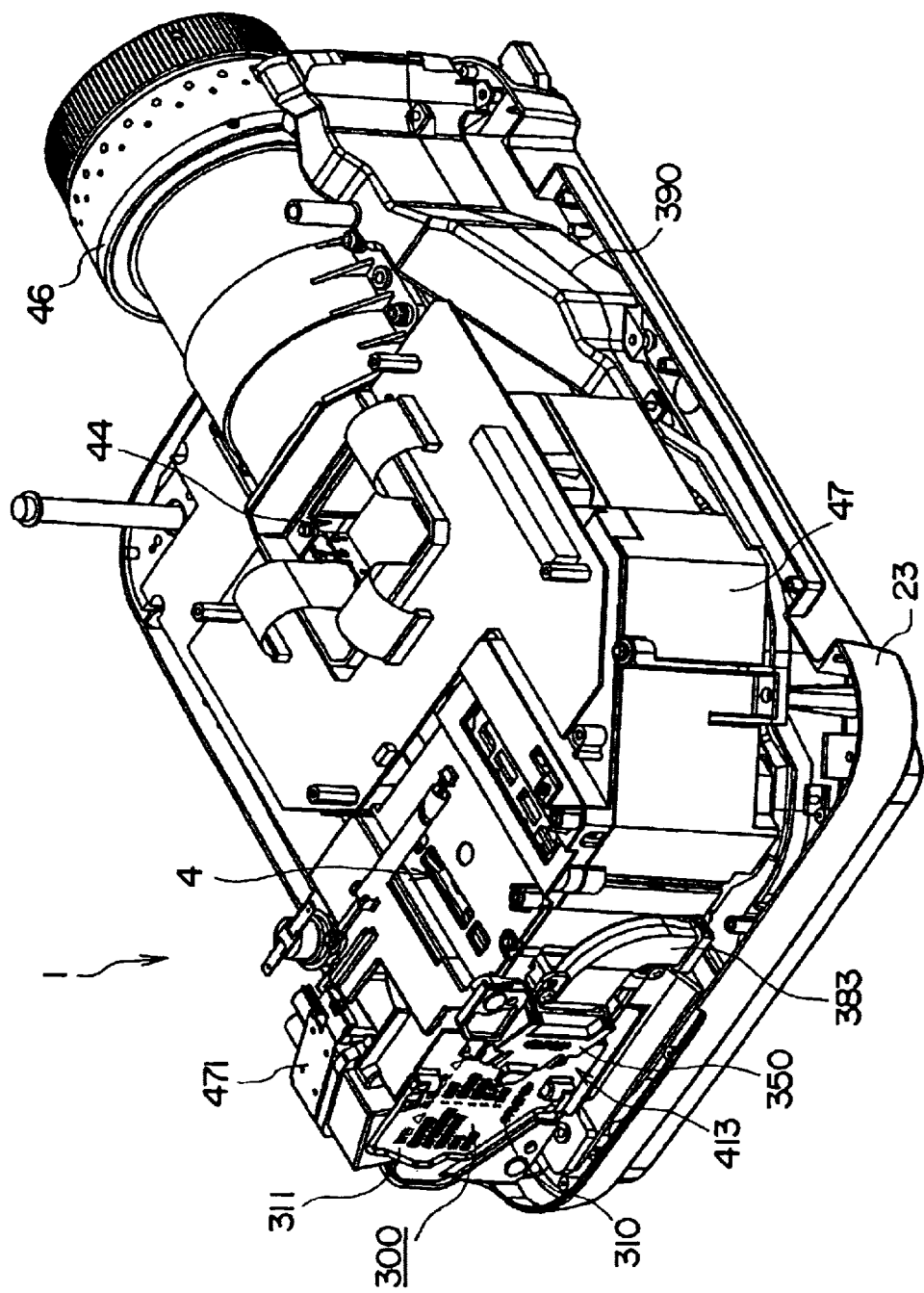
FIG. 14 is a perspective view showing a cooling mechanism of a light source according to a modification of the present invention.

For instance, though a cooling fan is provided in the aforesaid embodiment, such arrangement is not limiting but, as shown in FIG. 14, a hole may be formed on a part of the exhaust duct 390 and an exhaust duct 383 for discharging the air having cooled the inside of the device toward the outside of the device may be connected to the hole. In this case, the air inside the exhaust duct 390 is a mixture of the air inside the reflector and the air outside the reflector of substantially low temperature, which is lower than the temperature inside the reflector, so that sufficient cooling effect can be obtained.

Though the cooling air inhaled by the cooling fan is forcibly transferred from the duct to the cooing channel 340 and is discharged by the sirocco fan to the outside of the projector, the air inhaled by the sirocco fan may be forcibly transferred to the cooling channel 340 and discharged to the outside of the projector by the cooling fan. Accordingly, the cooling air can flow through the cooling channel 340 from the second cooling channel shutter 350 to the first cooling channel shutter 360.

Though a duct is provided in the aforesaid embodiment, the duct may be omitted when sufficient cooling air can be introduced into the light source by an opening opened and closed by the first cooling channel shutter 350.

Though the dust filter is provided respectively on the pair of openings in the aforesaid embodiment, the dust filter may be provided only to the air-introducing opening or air-discharging opening of the pair of openings.

Though a duct is formed between the first lid member 320 and the second lid member 330 in the aforesaid embodiment, the duct may be omitted when introduction of the cooling air from the outside of the case 300 and discharge of the after-cooling air toward the outside of the case 300 can be efficiently conducted.

Though the first and the second cooling channel shutters are provided with the lid member and the coil spring, the coil spring may be omitted when the lid member can be opened and closed by the light source protector side, and the configuration and arrangement may be determined in implementing the present invention.

Though two-types of cooling channel shutters are used in the aforesaid embodiment, only the first cooling channel shutter 350 may be used or only the second cooling channel shutter 360 may be used, which can be determined according to the configuration and arrangement of the light source protector.

Though the pair of openings is disposed in horizontal direction when being detached from the projector in the aforesaid embodiment, the pair of openings may be disposed in perpendicular direction.

Though the pair of openings is constructed of a recess 303 formed by cutting a part of peripheral end of the reflector 412 in the light-emitting direction in the aforesaid embodiment, the pair of openings maybe formed by, for instance, cutting a part of the light-transmissive plate.

The projector of the present invention is not limited to those having a crystal liquid panel as an optical modulator, but may be those having an optical modulator of plasma element and micro mirror, having a reflective optical modulator for reflecting and modulating to emit the incident light, and single-plate type, double-plate type and rear type. In other words, any arrangement is possible in implementing the present invention as long as the light beam irradiated from the source lamp is modulated in accordance with image information to form an optical image and the optical image is enlarged and projected by the projector

What is claimed is:

1. A light source used for a projector for modulating a light irradiated from a source lamp to form an optical image in accordance with image information and enlarging and projecting the optical image, comprising:

a source lamp;

a reflector for aligning and emitting the light irradiated from the source lamp; and a case for accommodating the source lamp and the reflector, wherein a light-emitting surface of the reflector is covered by a light-transmissive plate and a pair of openings is formed on a contact surface of the light-transmissive plate and the reflector, the pair of openings being symmetrically disposed around an optical axis of the reflector, and wherein the case includes a cooling channel for introducing a cooling air to the source lamp through the pair of openings and a cooling channel shutter for shutting the cooling channel when the case is detached from the projector and for opening the cooling channel when the case is attached to the projector on the pair of the openings, and is provided with a duct for guiding an air from an outside of the case to the cooling channel and/or from the cooling channel to the outside of the case.

2. The light source according to claim 1, wherein the pair of openings comprise recesses formed on a distal part of the reflector in the light-emitting direction.

3. The light source according to claim 1, wherein the pair of openings are horizontally disposed when the case is detached from the projector.

4. The light source according to claim 1, wherein the cooling channel shutter includes a lid member rotatably supported to the case for shutting an opening formed on the case and a biasing member for biasing the lid member in rotary direction.

5. The light source according to claim 1, wherein the cooling channel shutter includes a lid member slidably supported by the case for shutting an opening formed on the case and a biasing member for biasing the lid member in slide direction thereof.

6. The light source according to claim 1, wherein a dust filter is provided on the pair of openings.

7. A projector comprising a light source according to claim 1.

8. The projector according to claim 7, said a duct having an end inserted into the cooling channel shutter while being attached to the light source for introducing the cooling air into the light source.

9. The projector according to claim 8, wherein a fan for transferring the cooling air is provided on a base end of the duct.

10. The projector according to claim 8, further comprising an exhaust duct for discharging the air having cooled the inside of the light source, a base end of the duct being connected to the exhaust duct.

11. The light source according to claim 7, wherein the pair of openings comprise recesses formed on a distal part of the reflector in the light-emitting direction.

12. The light source according to claim 7, wherein the pair of openings are horizontally disposed when the case is detached from the projector.

13. The light source according to claim 7, wherein the cooling channel shutter includes a lid member rotatably supported to the case for shutting an opening formed on the case and a biasing member for biasing the lid member in rotary direction.

14. The projector according to claim 7, wherein the cooling channel shutter includes a lid member slidably supported by the case for shutting an opening formed on the case and a biasing member for biasing the lid member in slide direction thereof.

15. The projector according to claim 7, wherein the case is a portion of the projector.

16. The projector according to claim 7, wherein a dust filter is provided on the pair of openings.

* * * * *